Aug. 6, 1940.　　　E. O. STEUDEL　　　2,210,102
CAKE CIRCLE
Filed Nov. 18, 1937
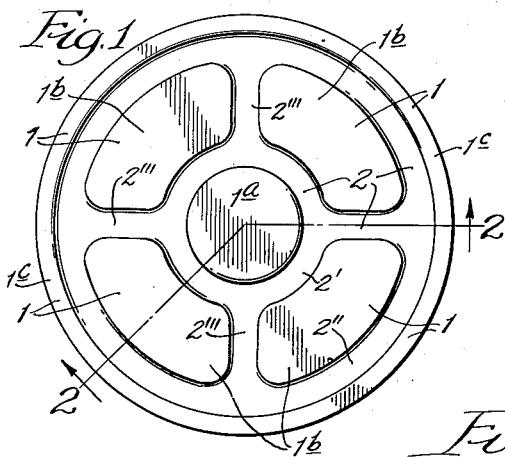
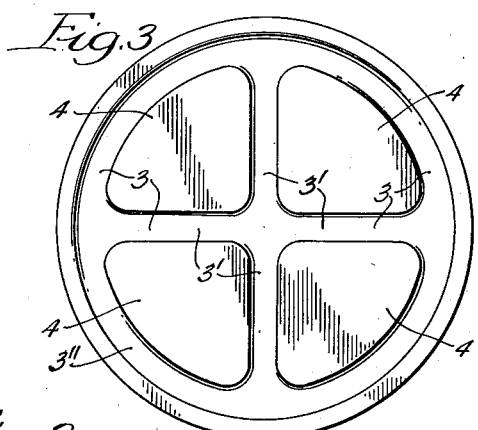
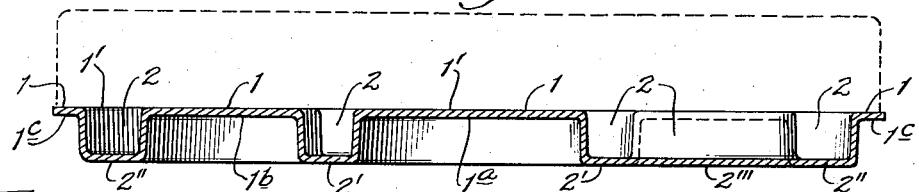
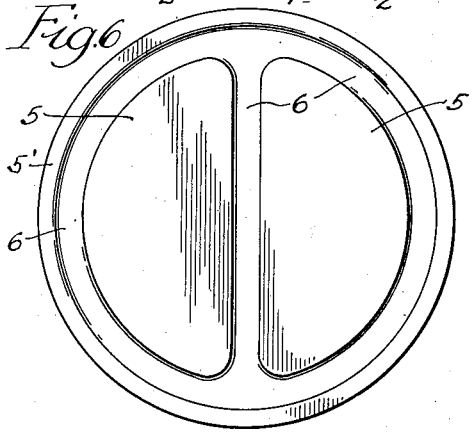
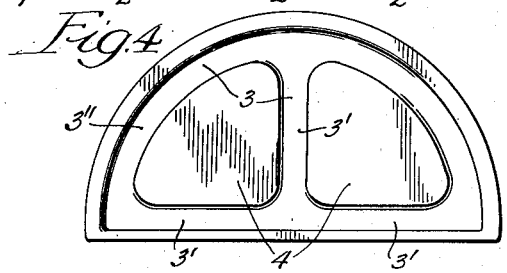
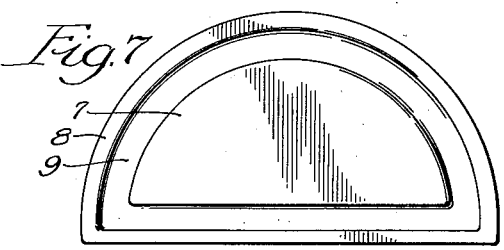
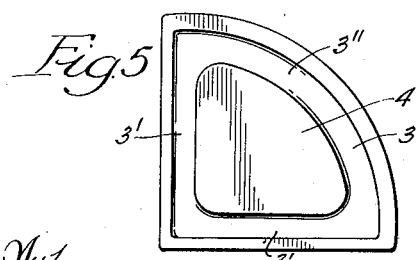
Inventor.
Erich O. Steudel,
Witnesses:
By Rummler, Rummler & Woodworth,
Attorneys.

Patented Aug. 6, 1940

2,210,102

UNITED STATES PATENT OFFICE 2,210,102

CAKE CIRCLE

Erich O. Steudel, Chicago, Ill.

Application November 18, 1937, Serial No. 175,282

2 Claims. (Cl. 65—15)

This invention relates to improvements in plates of molded fibrous material, for cake or analogous pastry, and is particularly an improvement on my Patent No. 1,979,911, issued November 6, 1934 and reissued January 7, 1936 as No. 19,813.

The main objects of this invention are to provide a cake or pastry plate having more stability than plates now have in use, without increasing the weight wherein the cake-bearing surface extends upwardly from a bearing surface and whereby any segment cut from said cake plate will be self-supporting on a plane surface; to provide such a plate which may be constructed or assembled in appropriate segmental sections in the event quarters or halves of the cake carried thereby are to be sold; to provide a plate having a single continuous flat-bottomed channel or the like extending downwardly from the cake-bearing surface distributedly throughout to reinforce and support effectively the entire area of the plate; to provide a circular plate which may be cut into quarters or halves at any segment thereof wherein each quarter or half will still function as an upraised platform onto which a quarter or half of the cake may seat, without fear of collapsing and be self-supporting; to provide a cake circle having a flat table or cake-bearing portion lying in a horizontal plane and supported by downwardly-extending flat-bottomed channels, the bottoms of which all lie in a common plane and to provide a cake "circle" or holder which shall be simple in form and construction, which can be made by a stamping or pressing operation, and which shall be inexpensive to manufacture.

Illustrative embodiments of this invention are shown by the accompanying drawing, in which:

Fig. 1 is a top plan view of my improved cake plate in discoidal form.

Fig. 2 shows a cross-sectional view of the same on a larger scale and taken on the line 2—2 of Fig. 1, and illustrates a cake in position thereon as shown in dotted outline.

Figs. 3, 4, 5, 6, and 7 are plan views of modified forms of plates or plate sections embodying my invention.

Referring to the device shown in Fig. 1, this is a circular molded pulp plate of sheet-like form having raised flat body parts 1 and a continuous connecting rib or channel 2 distributed throughout its area. In greater detail this plate has a pair of concentric channels one positioned near the outer peripheral edge of the plate and the other positioned near the center of the plate. The channels are connected by four channels extending radially of the plate. The resulting body parts 1 are of various shapes as indicated at 1a, 1b and 1c. The bottom portions of said channels indicated as 2', 2'', and 2''' all lie in the same horizontal plane, thereby giving the plate a distributed bearing part which, in effect, is substantially the equivalent of the ordinary flat-bottom "pie plate" and having the same stability. The cake-receiving upper surface as a whole is substantially continuous, as appears at 1'.

As can readily be seen, the cake-bearing portions 1 are formed and arranged in such a manner that the cake cannot "sag" or "crack" as the entire bearing area is practically the equivalent of a continuous flat surface. Moreover, by molding the plate in this form its stability is very appreciably increased over the cake plate forms now in use.

It can now be apparent that after a whole cake is placed on the circle a sales person may readily divide the cake in any manner desired by the customer. When the cake is being divided into any segmental portion the sales person cuts right through the plate and thereby the customer is provided with a sanitary base upon which the cake rests and which plate will not collapse and be self-supporting when placed on a plane surface. This obviates the necessity of provision of the additional plates on which the baker usually puts the segmental portions when less than the entire cake is sold, thereby cutting the plate costs.

In the form shown in Fig. 3, the plate is practically identical with the one shown in Fig. 1, except that by modifications of the channels 3 the center-bearing portion 1a of the latter figure has been omitted, thereby extending the apex of the four triangular body members 4 nearly to the center of the plate. Here again, however, the channels 3' and 3'', are interconnected to form a continuous channel throughout the area of the plate with the radial channels extending outwardly from the center of the plate. Figs. 4 and 5 are almost identical with the plate shown in Fig. 3, except that they show half and quarter plates respectively, each containing connecting channels as described with reference to Fig. 3.

Fig. 6 shows another form of my invention, with a pair of semicircular cake-bearing surfaces 5 and a ring surface 5', having connecting channels 6. Fig. 7 is almost identical with the form shown in Fig. 6, except that it shows only one half of the construction shown in Fig. 6. Here the flat body parts 7 and 8 are separated, by the channel 9.

It is now apparent that the forms shown in Figs. 4, 5, and 7 may be the result of a cutting operation of the baker or salesperson. A cake and the plate upon which it rests may be cut into quarters or halves while the cake is retained on the plate, and the plate may still serve its intended function of supporting any portion of the cut cake without fear of having the plate collapse. This, of course, is due to the peculiar channelled manner in which the plate is made. This feature carries an inherent advantage over the plates now in use.

It is to be understood that some of the details set forth may be altered or omitted without departing from the spirit of the invention as defined by the appended claims.

I claim:

1. A cake plate formed of a circular piece of flat molded pulp having a plurality of connected channels, one of said channels being positioned adjacent and following the outer peripheral edge of said plate and another of said channels being circular and positioned adjacent the center of said plate, each of said channels being interconnected by channels extending radially from the central portion of the plate, and the floor of all of said channels lying in the same horizontal plane whereby any segment cut from said plate will be self-supporting on a plane surface.

2. A cake plate of the class described formed symmetrically about its center, said plate comprising a plurality of equally elevated load-bearing planar parts and downward channel parts of mutually equal depth to support and connect said planar parts, said channel parts including straight channels radiating from the central part of the plate, and arcuate channels connecting the outer ends of said straight channels, said plate being molded of sheet pulp adapted for segmental cutting with cake or the like supported on said plate for portion service or sale, and said channel parts having walls of sufficient stiffness to support the several resulting cake sections.

ERICH O. STEUDEL.